United States Patent
Hong

(10) Patent No.: US 12,277,182 B2
(45) Date of Patent: Apr. 15, 2025

(54) SERVICE PROVIDING APPARATUS AND METHOD FOR PROVIDING SEARCH PATH

(71) Applicant: Ascent Korea Co., Ltd., Seoul (KR)

(72) Inventor: Ki Joo Hong, Seongnam-si (KR)

(73) Assignee: Ascent Korea Co., Ltd., Seoul (KR)

( * ) Notice: Subject to any disclaimer, the term of this patent is extended or adjusted under 35 U.S.C. 154(b) by 0 days.

(21) Appl. No.: 18/227,873

(22) Filed: Jul. 28, 2023

(65) Prior Publication Data
US 2024/0061894 A1 Feb. 22, 2024

(30) Foreign Application Priority Data
Aug. 17, 2022 (KR) .................. 10-2022-0102659

(51) Int. Cl.
*G06F 16/9532* (2019.01)
*G06F 16/3332* (2025.01)
*G06F 40/242* (2020.01)
*G06Q 30/0273* (2023.01)

(52) U.S. Cl.
CPC ...... *G06F 16/9532* (2019.01); *G06F 16/3338* (2019.01); *G06F 40/242* (2020.01); *G06Q 30/0273* (2013.01)

(58) Field of Classification Search
CPC .............. G06F 16/9532; G06F 40/242; G06F 16/3338; G06F 16/3334; G06Q 30/0273
USPC ....................................................... 707/708
See application file for complete search history.

(56) References Cited

U.S. PATENT DOCUMENTS

| 9,652,537 B2 * | 5/2017 | Ahari .................... G06F 16/337 |
| 10,198,497 B2 * | 2/2019 | Gangavaram ......... G06F 16/245 |
| 2003/0171914 A1 * | 9/2003 | Jung ................... G06F 16/3338 |
| | | 704/7 |

(Continued)

FOREIGN PATENT DOCUMENTS

| CN | 104462084 A | * | 3/2015 | ....... G06F 16/90324 |
| CN | 105426537 A | * | 3/2016 | ......... G06F 16/9535 |

(Continued)

OTHER PUBLICATIONS

Yue et al., "Quantum Path Integral Inspired Query Sequence Suggestion for User Search Task Simplification", 2010 IEEE International Conference on Data Mining Workshops, 2010, pp. 647-654. (Year: 2010).*

(Continued)

*Primary Examiner* — Phuong Thao Cao
(74) *Attorney, Agent, or Firm* — Heedong Chae; Lucem, PC

(57) ABSTRACT

Disclosed are a service providing apparatus and a service providing method for providing a search path in order to support a related search word having a related search word having the highest relevancy to be easily selected and used for marketing up to reaching a requested search word of a user by providing a search path which enables relationships between other search words related to a search word requested by a user, and the search word to be determined as a distance. According to the present disclosure, there is an effect of supporting a related search word having the highest relevancy with the request search word of the user and having high advertising efficiency among search words positioned on a path for reaching the request search word of the user to be easily selected and used for marketing.

7 Claims, 11 Drawing Sheets

(56) References Cited

U.S. PATENT DOCUMENTS

| | | | | |
|---|---|---|---|---|
| 2008/0104056 | A1* | 5/2008 | Li | G06F 16/3346 |
| | | | | 707/999.005 |
| 2011/0202526 | A1* | 8/2011 | Lee | G06F 16/3344 |
| | | | | 707/726 |
| 2014/0365494 | A1* | 12/2014 | Gangavaram | G06F 16/245 |
| | | | | 707/739 |
| 2015/0032767 | A1* | 1/2015 | Gao | G06F 16/9535 |
| | | | | 707/765 |
| 2015/0161239 | A1* | 6/2015 | Stepinski | G06F 16/3325 |
| | | | | 707/765 |
| 2019/0236187 | A1* | 8/2019 | Fitchett | G06F 16/9024 |
| 2019/0317965 | A1* | 10/2019 | Remis | G06F 16/3322 |
| 2020/0278987 | A1* | 9/2020 | Liu | G06F 16/901 |
| 2020/0394223 | A1* | 12/2020 | Nishimura | G06F 16/951 |
| 2022/0004589 | A1* | 1/2022 | Park | G06F 40/279 |
| 2022/0108333 | A1* | 4/2022 | Tenneti | G06F 16/9024 |
| 2022/0374141 | A1* | 11/2022 | Garcia-Ojalvo | G06F 3/04883 |

FOREIGN PATENT DOCUMENTS

| | | | | | |
|---|---|---|---|---|---|
| CN | 106294618 | A | * | 1/2017 | ........... G06F 16/951 |
| CN | 112559693 | A | * | 3/2021 | ......... G06F 16/3344 |
| CN | 112818092 | A | * | 5/2021 | ......... G06F 16/3325 |
| CN | 113312523 | A | * | 8/2021 | |
| CN | 113609379 | A | * | 11/2021 | |
| CN | 114896377 | A | * | 8/2022 | ......... G06F 16/3329 |
| JP | 2012003532 | A | * | 1/2012 | |

OTHER PUBLICATIONS

Yue et al., "Quantum Path Integral Inspired Query Sequence Suggestion for User Search Task Simplification", 2010 IEEE International Conference on Data Mining Workshops, 2010, pp. 647-654. (previously provided) (Year: 2010).*

* cited by examiner

| Keyword | Basic search word | Related search word |
|---|---|---|
| Kookmin Bank | Kookmin Bank Ga | [Kookmin Bank virtual account, Kookmin Bank household account book, Kookmin Bank virtual account deposit time..] |
| Kookmin Bank | Kookmin Bank Na | [Kookmin Bank Narasarang Card, Kookmin Bank Narasarang Card benefit, Kookmin Bank Namuwiki...] |
| Kookmin Bank | Kookmin Bank Da | [Kookmin Bank calendar, Kookmin Bank dollar, Kookmin Bank mortgage...] |

FIG. 3

| Featrure | Description |
|---|---|
| AD | As advertising area related to search word, displayed as advertising at top left side of search result |
| AD Carousel | As advertising area related to search word, display bundle of information such as price, image, etc. of product which is advertised jointly by thumbnail |
| Application | Display description and installation icons for mobile application by icons |
| Featured Snippents | Positioned above general search in search result page, and display correct answer of search in form of simple text and table |
| Image | Display image and tag information related to search word |
| Job Search | When search word related to recruit is inputted, display information related to recruit such as job title, type of company recruit, etc. |
| Knowledge panel | Display person, place, company, local business, non-profit institution, other widely known entity name information |
| Local Result | Display location based result by map according to subject of search word and geographical location of searching person |
| People also ask for | Collection of additional questions related to search word |
| People also search for | Collection of other search words searched jointly with search word |
| Related Searches | Collection of other search words related to search word |
| Sitelinks | Display website information related to search word |
| Twitter Carousel | Display up-to-date or popular twitter information related to search word |
| Unit Converter | Area providing function of converting unit such as length or weight |
| Video Carousel | Display video information related to search word |

FIG. 4

| Items searched jointly | Related search word |
|---|---|
| Q Women's perfume ranking 2021 | Q Olive Young women's perfume recommendation |
| Q 20s women's perfume ranking 2021 | Q Women's perfume present |
| Q 40s women's perfume recommendation | Q Women's perfume brand ranking |
| Q 30s women's perfume recommendation | Q Sweet women's perfume |
| Q 10s women's perfume recommendation | Q Women's perfume ranking which men like |
| Q Subtle women's perfume | Q Jomalone women's perfume ranking |

FIG. 5

| Search word | Search quantity | Advertising unit price | Competition index |
|---|---|---|---|
| Women's perfume | 1000 | 0.59 | 0.99 |
| Women's perfume recommendation ranking 2021 | 20 | 0.3 | 0.85 |
| 20s women's perfume ranking 2021 | 100 | 0 | 0.75 |
| Subtle women's perfume | 20 | 0.43 | 1 |

[['Women's perfume'->'Women's perfume recommendation 2021'
->'Subtle women's perfume', 'Women's perfume'->
'20s women's perfume ranking 2021'->'Subtle women's perfume']]

```
{
"query":"Anbang grill",
"order":"Advertising unit price",
"result":
    [{"rank":1,"path":['grill','Grill','grill recommendation,'Anbang grill',
        'Anbang grill 501','Anbang grill ab301mf','Fish grill'],
        "score":0.4854},
    {"rank":2,"['Oil non-spattering grill','Anbang grill','Anbang grill
        disadvantage','Electric grill disadvantage']"score":0.3865},
    {"rank":3,"path":['Oil non-spattering grill','Oil non-spattering grill',
        'Anbang grill','Anbang grill disadvantage','Electric grill
        disadvantage']"score":0.3315},
    {"rank":4,"path":['Anbang grill','Anbang grill disadvantage',
    'Electric grill disadvantage']"score":0.3286},
    {"rank":5,"path":['Aone grill','Anbang grill','Anbang grill
    disadvantage','Electric grill disadvantage']"score":0.3258},
    {"rank":6,"path":['Non-smoke grill','Anbang grill','Anbang grill
    disadvantage','Electric grill disadvantage']"score":0.3181},
    {"rank":7,"path":['Tefal induction frying pan','Tefal electric
    frying pan','Anbang grill','Anbang grill disadvantage','Anbang grill
    Clien']"score":0.3058},
    {"rank":8,"path":['Electric grill pan recommendation','Anbang grill',
    'Anbang grill','Electric grill disadvantage']"score":0.3025},
    {"rank":9,"path":['Meat roasting grill','Anbang grill','Anbang grill
    vs Zaigle']"score":0.2998},
    {"rank":10,"path":['Anbang grill','Anbang grill','Anbang grill
    disadvantage','Electric grill disadvantage']"score":0.2972}]
}
```

FIG. 8

SERVICE PROVIDING APPARATUS AND METHOD FOR PROVIDING SEARCH PATH

CROSS-REFERENCE TO RELATED APPLICATIONS

This application claims the priority of Korean Patent Application No. 10-2022-0102659 filed on Aug. 17, 2022, in the Korean Intellectual Property Office, the disclosure of which is incorporated herein by reference.

BACKGROUND OF THE INVENTION

Field of the Invention

The present disclosure relates to a service providing apparatus and a service providing method for providing a search path, and more particularly, to a service providing apparatus and a service providing method for providing a search path in order to support a related search word having a related search word having the highest relevancy to be easily selected and used for marketing up to reaching a requested search word of a user by providing a search path which enables relationships between other search words related to a search word requested by a user, and the search word to be determined as a distance.

Description of the Related Art

Recently, various strategies has been developed to promote products and services, and keyword searches among the strategies, along with the development of the Internet, have been required for digital advertising/marketing strategies.

In particular, finding an efficient keyword for advertising in online commerce plays a big role in determining the performance of the entire marketing.

Further, a search user repeats search and evaluation processes when searching for any product or service, and finally determines an action (subscription, purchase, etc.).

For example, a search for purchasing can often be converted into a purchase through a journey such as starting in a comprehensive keyword, moving to detailed brands or product keywords, and viewing a review or ranking, or comparing competitors in a product line. In this case, search words that are finally contributing to the conversion are easy to detect because they have a relatively high search quantity or conversion rate, but the advertising unit price is high, so it may not be suitable in terms of advertising efficiency.

However, search terms in the search and evaluation processes around the conversion stage are relatively low in search and the competition is not severe, so the advertising unit price is low, which can be more suitable in terms of advertising efficiency.

As described above, it is very important to secure a search word suitable for advertising and marketing in consideration of the advertising efficiency, but the search terms in the search and evaluation processes around the conversion stage are often long-tail keywords relatively difficult to find, so there is a problem in that it is difficult to establish or a marketing strategy or optimize advertising by using the keywords.

Although various search engines have provided related search words related to high advertising unit prices, they are only offering simple related search words, so the related search words are too diverse and it is difficult to distinguish related search words having high efficiency up to reaching search words desired by marketers and sellers, so it is difficult to select a search term that can increase the advertising efficiency. In other words, although the marketing strategy is established around the conversion stage (user's needs for the product and service, comparison items in the product line, required information before and after purchasing) during the search journey of the user or there are many keywords for optimization of advertising, there is a problem in that ordinary companies or users are not easy to discover and use the keywords.

SUMMARY OF THE INVENTION

The present disclosure has been made in an effort to generate a basic search word while adding different letters for a keyword, and then add a related search word provided by a search engine for the basic search word and extend the search word, generate a path representing a relationship between a subsequent search word and the related search word obtained based on a search result of searching the related search word through the search engine with an input search word by a distance based on the search result, generates the path for each of various search words and provide a path list related to a search word requested by a user to support a related search word having highest relevancy to be easily selected and used for marketing up to reaching the requested search word of the user.

According to an exemplary embodiment of the present disclosure, a service providing apparatus for providing a search path may include: a search word expansion unit configured to differently add a series of letters to a keyword and automatically generate one or more basic search words in which the keyword and the letters are combined, and acquire one or more related search words related to the basic search word through a predetermined search engine; a search information extraction unit configured to extract one or more subsequent search words from one or more response results corresponding to one or more response function-specific function types, respectively which the search engine uses by determining a search intention of the input search word based on search result list information returned by applying the related search word to the search engine as an input search word, and then generate relationship information for a distance between each of one or more subsequent search words and the input search word by a distance calculation scheme of calculating a weight for a connection relationship between the input search word and the subsequent search word according to an exposure ranking in the response result corresponding to the subsequent search word and a function type of the response result as the distance and store the generated relationship information in the search word relationship DB; a search path extraction unit configured to generate a direction weight graph in which an inter-node distance is set by setting each of the plurality of search words as the node based on the plurality of relationship information stored in the search word relationship DB, and then generate the search path information for each of one or more search paths connecting a start node and an end node determined according to a predetermined algorithm in the direction weight graph, generate statistical information acquired by averaging predetermined item-specific statistical amounts for the plurality of search words included in the search path information, and then match the statistical information and the search path information and store the matched information in the search path DB; and an optimal path recommendation unit configured to generate recommendation list information in which one or more search path information including a request search word is sorted based on the ranking condition and statistical information at the time of receiving request information including a request search word and a ranking condition from a user terminal, and provide the generated recommendation list information to the user terminal.

As an example related to the present disclosure, the related search word may be an auto complete search word generated by the search engine based on the basic search word.

As an example related to the present disclosure, the search information extraction unit calculates the weight by multiplying a priority predetermined for a function type corresponding to the subsequent search word and an expose ranking for the subsequent search word in a response result corresponding to the subsequent search word, and sets the calculated weight as the distance between the subsequent search word and the input search word.

As an example related to the present disclosure, the search information extraction unit applies the subsequent search word as another input search word to the search engine, and as a result, applies a subsequent search word as an input search word to the search engine to extract one or more texts as each additional subsequent search word corresponding to the subsequent search word in each of one or more response results corresponding to each of one or more response function-specific function types that are used by determining the search intention of the input search word by the search engine according to the distance calculation method based on the returned search result list information, calculate, as a distance, a weight for a connection relationship between the input search word and the additional subsequent search word according to an exposure ranking of an additional subsequent search word in a response result corresponding to the additional subsequent search word and a function type of a response result corresponding to the additional subsequent search word, and generates relationship information about a distance from an input search word, which is the subsequent search word, to be stored in the search word relationship DB for each of the one or more additional subsequent search words.

As an example related to the present disclosure, the search path extraction unit confirms one or more end nodes corresponding to the start node according to the algorithm while changing the start node, and calculates K search paths preset in order of shorter search path distance among search paths connecting the start node and the end node, and then generates the search path information for each calculated search path.

As an example related to the present disclosure, the search path extraction unit determines a predetermined number of end nodes in order of relatively higher importance with the start node based on a pagerank algorithm.

As an example related to the present disclosure, the search path extraction unit calculates statistical information including an average value of an item-specific statistical amount of at least one of a search quantity, an advertising unit price, and a competition index for a plurality of search words included in the search path information, and then matches the calculated statistical information with the search path information corresponding to the statistical information and stores the matched information in the search path DB.

As an example related to the present disclosure, the optimal path recommendation unit extracts, from the search path DB, one or more search path information and one or more statistical information corresponding to the request search word included in the request information at the time of receiving the request information from the user terminal, calculates a score according to a predetermined score calculation criterion for each of one or more items according to the ranking condition included in the request information for the one or more extracted statistical information and sorts the one or more extracted statistical information in the order of the score, and then selects one or more search path information corresponding to statistical information having a predetermined reference ranking among one or more search path information corresponding to the one or more sorted statistical information, respectively, and provides recommendation list information including the one or more selected search path information to the user terminal.

As an example related to the present disclosure, the optimal path recommendation unit includes at least one of statistical information corresponding to the search path information, search quantity information including an item-specific statistical amount for each of the plurality of search words included in the search path information, and function type information for a function type of a response result corresponding to each of the plurality of search words included in the recommendation search path information in the recommendation list information to correspond to each of one or more search path information included in the recommendation list information, and then provides the recommendation list information to the user terminal in the form of the UI or API.

According to another exemplary embodiment of the present disclosure, a service providing method for providing a search path of a service providing apparatus may include: differently adding a series of letters to a keyword and automatically generating one or more basic search words in which the keyword and the letters are combined, and acquiring one or more related search words related to the basic search word through a predetermined search engine; extracting one or more subsequent search words from one or more response results corresponding to one or more response function-specific function types, respectively which the search engine uses by determining a search intention of the input search word based on search result list information returned by applying the related search word to the search engine as an input search word, and then generating relationship information for a distance between each of one or more subsequent search words and the input search word by a distance calculation scheme of calculating a weight for a connection relationship between the input search word and the subsequent search word according to an exposure ranking in the response result corresponding to the subsequent search word and a function type of the response result as the distance and storing the generated relationship information in the search word relationship DB; generating a direction weight graph in which an inter-node distance is set by setting each of the plurality of search words as the node based on the plurality of relationship information stored in the search word relationship DB, and then generating the search path information for each of one or more search paths connecting a start node and an end node determined according to a predetermined algorithm in the direction weight graph, generate statistical information acquired by averaging predetermined item-specific statistical amounts for the plurality of search words included in the search path information, and then matching the statistical information and the search path information and storing the matched information in the search path DB; and generating recommendation list information in which one or more search path information including a request search word is sorted based on the ranking condition and statistical information at the time of receiving request information including a request search word and a ranking condition from a user terminal, and providing the generated recommendation list information to the user terminal.

According to the present disclosure, there is an effect in that a related search word related to a basic search word by applying each basic search word obtained while adding different letters for a keyword to a search engine to extend the search word, a relevancy between one or more subsequent search words and an input search word obtained based on a search result of searching the extended search word through a search engine by applying the extended search word to the search engine with the input search word is obtained by a distance according to a search intention of the input search word and an exposure ranking of the subsequent search word determined in the search word, search words with a distance from each other are interconnected based on a distance between the search words to generate a search path, and then a recommended search path list is provided, which is related to a request search requested by a user and an advertising attribute on which the user puts emphasis to support a related search word having the highest relevancy with the request search word of the user and having high advertising efficiency among search words positioned on a path for reaching the request search word of the user through the recommended search path list to be easily selected and used for marketing.

Further, according to the present disclosure, there is an effect in that an optimal search path corresponding to the request search word requested by the user is provided in the form of UI or API to support the user to easily obtain a search word list suitable for advertising/marketing, search information (a search quantity, an advertising unit price, advertising competition, etc.) for the search word, and function type information.

Moreover, according to the present disclosure, there is an effect in that a connection relationship between the search words is just expressed by exceeding a level of providing the related search word through a word network UI generated based on the search path to be provided to determine a primary search journey of users for products or services, and needs of the user for what the user requests, what the user compares, etc., are supported to be more intuitively determined.

BRIEF DESCRIPTION OF THE DRAWINGS

The above and other aspects, features and other advantages of the present invention will be more clearly understood from the following detailed description taken in conjunction with the accompanying drawings, in which:

FIG. 3 is an exemplary diagram for a process of acquiring a related search word of the service providing apparatus according to an exemplary embodiment of the present disclosure;

FIG. 4 is an exemplary diagram for an SERP feature (function type) type definition of the service providing apparatus according to an exemplary embodiment of the present disclosure;

FIG. 5 is an exemplary diagram of detection of a subsequent search word of the service providing apparatus according to an exemplary embodiment of the present disclosure;

FIG. 7 is an exemplary diagram for generation of a search path of the service providing apparatus according to an exemplary embodiment of the present disclosure;

FIG. 8 is an exemplary diagram for providing of API based recommendation list information including a recommended search path of the service providing apparatus according to an exemplary embodiment of the present disclosure;

DETAILED DESCRIPTION OF THE PREFERRED EMBODIMENT

Hereinafter, detailed exemplary embodiments of the present disclosure will be described with reference to the drawings.

Figure 1:
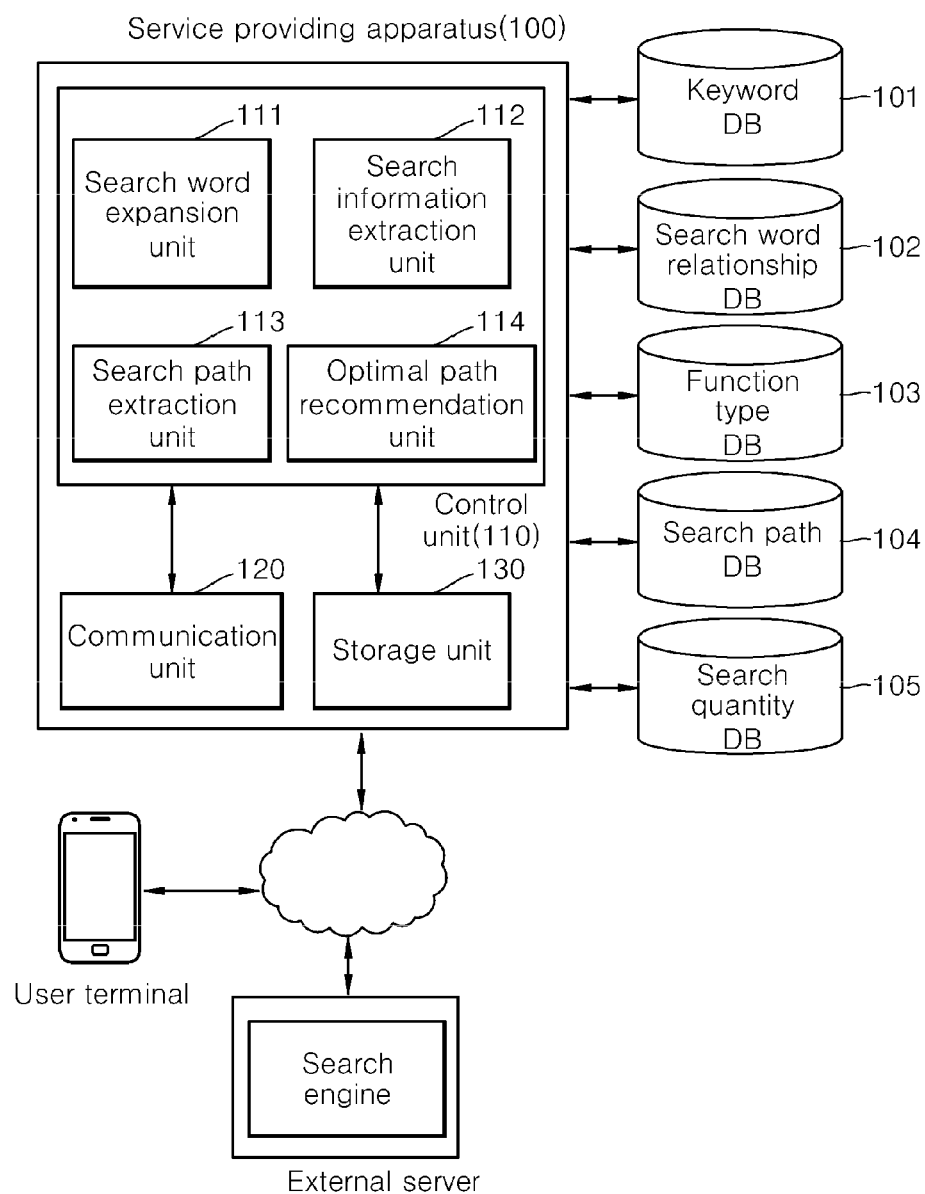
FIG. 1 is a configuration diagram of a service providing apparatus for providing a search path according to an exemplary embodiment of the present disclosure.

FIG. 1 is a configuration diagram of a service providing apparatus (hereinafter, referred to as a service providing apparatus) for providing a search path according to an exemplary embodiment of the present disclosure.

As illustrated, the service providing apparatus 100 according to the exemplary embodiment of the present disclosure may be configured to include a communication unit 120, a storage unit 130, and a control unit 110, and is not limited thereto, and may be configured to include various components.

First, the communication unit 120 may communicate with one or more user terminals and various external servers through a communication network.

In this case, the communication network described in the present disclosure may include a wired/wireless communication network, and examples of the wireless communication network may include Digital Living Network Alliance (DLNA), Wireless Broadband (Wibro), World Interoperability for Microwave Access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), 5G mobile communication service, Bluetooth, Long Range (LoRa), Radio Frequency Identification (RFID), Infrared Data Association (IrDA), Ultra Wideband (UWB), ZigBee, Near Field Communication (NFC), Ultra Sound Communication (USC), Visible Light Communication (VLC), Wi-Fi, Wi-Fi Direct, and the like. In addition, the wired communication network may include wired local area network (LAN), wired wide area network (WAN), power line communication (PLC), USB communication, Ethernet, serial communication, optical/coaxial cables, etc.

In addition, the storage unit 130 may store various kinds of information, and the storage unit 130 may be configured in various forms such as a hard disk drive (HDD) and a solid state drive (SSD), and may be configured to include one or more DBs.

For example, the storage unit 130 may be configured by including a plurality of DBs necessary for the operation of the service providing apparatus 100. A keyword DB 101 storing a plurality of different keywords may include various DBs, such as a search word relationship DB 102 for storing relationship information on relationships between search words, a function type DB 103 for storing information related to function types corresponding to search words, a search path DB 104 for storing information on search paths and statistics corresponding to search words, and a search quantity DB 105 for storing search quantity information including statistics for each item preset for each search word.

At this time, the plurality of DBs included in the storage unit 130 may also be configured as separate database servers, and the service providing apparatus 100 may communicate and interwork with a plurality of different database servers via a communication network.

In addition, the control unit 110 performs an overall control function of the service providing apparatus 100, and the control unit 110 may include a RAM, a ROM, a CPU, a GPU, and a bus, and the RAM, the ROM, the CPU, the GPU, etc. may be connected to each other via the bus.

In addition, the communication unit 120 and the storage unit 130 may also be configured to be included in the control unit 110.

At this time, the control unit 110 and at least one of various components constituting the control unit 110 may communicate with the user terminal and an external server via the communication unit 120. Hereinafter, the communication configuration through the communication unit 120 will be omitted.

In addition, as illustrated in FIG. 1, the control unit 110 may be configured by including a search word expansion unit 111, a search information extraction unit 112, a search path extraction unit 113, and an optimal path recommendation unit 114.

At this time, a plurality of components constituting the control unit 110 may be implemented by a processor capable of processing data and the like, and respective components may be separately implemented by different processors or also functionally separated within one processor.

Based on the above-described configuration, a detailed operation configuration of the service providing apparatus 100 will be described below with reference to the drawings.

Figure 2:
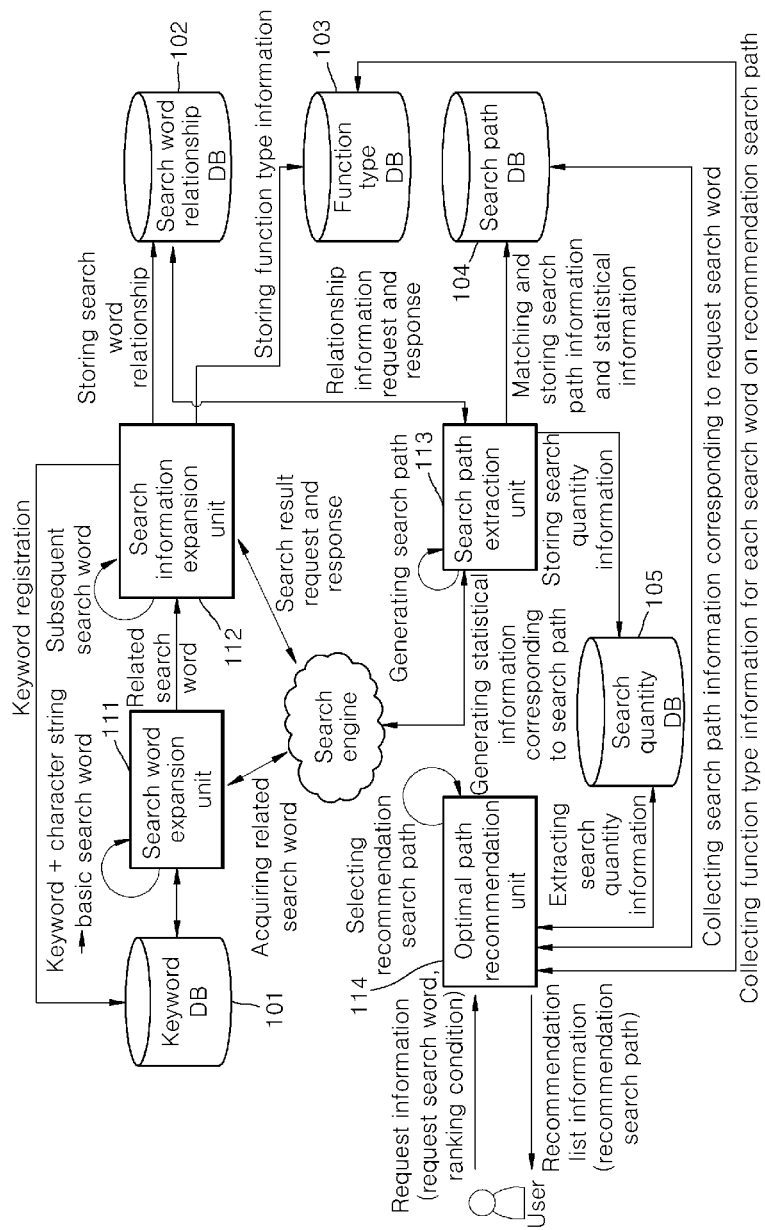
FIG. 2 is a diagram illustrating an operation example of the service providing apparatus according to an exemplary embodiment of the present disclosure.

FIG. 2 is a detailed operational configuration diagram of the service providing apparatus 100 according to an exemplary embodiment of the present disclosure, and the configuration of the control unit 110 that performs actual control functions of the service providing apparatus 100 will be mainly described.

As illustrated in FIG. 1, the search word expansion unit 111 may extract keywords from the keyword DB 101 in which a plurality of different keywords for companies, brands, products, services, categories, etc. are stored. While a series of characters are added differently to the keywords, one or more search words in which the keywords in which the keywords and characters are combined and one or more characters are combined may be automatically generated as basic search words.

At this time, the search word expansion unit 111 may communicate with an external knowledge server that provides an online electronic dictionary to collect the keywords from the external knowledge server and store the keywords in the keyword DB 101. An example of such an external knowledge server may include a server that provides DBPEDIA, Wikipedia, or the like.

For example, the search word expansion unit 111 may access the external knowledge server to extract and store a page name or a knowledge panel title with the keywords.

In addition, the search word expansion unit 111 may acquire one or more related search words related to the basic search words through a predetermined search engine.

Referring to FIG. 3, the search word expansion unit 111 may extract a keyword 'Kookmin Bank' stored in the keyword DB 101, add 'Ga' to the keyword to generate a basic search word such as 'Kookmin Bank Ga', and add 'Na' to the keyword to generate a basic search word such as 'Kookmin Bank Na'.

In addition, the search word expansion unit 111 may add characters (or letters) from 'Da' to 'Ha' to the keyword 'Kookmin Bank' in sequence to generate basic search words corresponding to each added character. Even in addition to the example, the search word expansion unit 111 may add a character with a final consonant such as 'Gang', add a foreign language such as 'A', or multiple characters such as 'GaGa', 'AA', etc. to the keyword.

In addition, characters that are able to be added to the keyword by the search word expansion unit 111 may include blank characters or special characters.

In addition, the search word expansion unit 111 may apply the search word 'Kookmin Bank Ga' generated as described above to a search engine preset in the service providing apparatus 100 or a search engine provided from an external server through communication with the external server to acquire an related search word related to 'Kookmin Bank Ga' from the search engine.

As an example of such a search engine, a search engine of 'NAVER' or 'GOGGLE' may be used. When the search engine is included in the service providing apparatus 100, the search engine-related execution data may be stored in the storage unit of the service providing apparatus 100.

In addition, the related search word may be configured by an auto complete search word (or an auto complete query word) automatically completed a meaningful search word (or query word) by receiving the basic search word by the search engine.

For example, when the search engine receives 'Kookmin Bank Ga' as a basic search word from the search word expansion unit 111, related search words such as 'Kookmin Bank virtual account', 'Kookmin Bank household account book', etc., which are auto complete search words starting from 'Kookmin Bank Ga' or including the basic search word, are automatically generated. The search word expansion unit 111 may acquire one or more related search words for one basic search word from the search engine.

As another example, when the search engine receives 'iPhone Ga' as a basic search word from the search word expansion unit 111, related search words such as 'iPhone price', 'iPhone forced termination', etc., which are auto complete search words starting from 'iPhone Ga' or including the basic search word, are automatically generated.

Alternatively, the search engine is included in an external server that provides (includes) the search engine based on the basic search word, and may search a DB in which various search words are stored to acquire a related search word starting from the basic search word or including the corresponding basic search word, and then provide the acquired related search word to the search word expansion unit 111. In addition, the search engine is included in the external server that provides the search engine based on a basic search word, and may search the DB where various search words are stored to generate related search words in sentences, or extract the sentence including the basic search word from the DB to be provided to the search word expansion unit 111 as a related search word.

In addition, the search word expansion unit 111 may store the related search word acquired through the search engine in the keyword DB 101.

Meanwhile, the search information extraction unit 112 applies the one or more related search words corresponding to the basic search word to the search engine as input search words in conjunction with the search word expansion unit 111, respectively, to acquire search result list information including one or more search results corresponding to the input search word through the search engine.

At this time, the search result described in the present disclosure may be search result information generated by the search engine, and the search result information may include a search language, a search region, a search engine name, a search result position (ranking), a domain, a function type (SERP Feature), a title, a text, etc., and may be configured as text-based documents.

In addition, the search engine determines a search intention of the related search word in the search engine in addition to providing a document-based search result for a web site or web page for the input search word to generate a direct response result by using a response function corresponding to the determined search intention among one or more different unique response functions provided by the search engine and then provide the generated direct response result as the search result.

For example, as illustrated in FIG. 4, the search engine provides one or more response results for each response function as a search result through a search engine result page (SERP), and determines the search intention of the input search word among the response results provided through the SERP. In addition, the search engine generates and provides a response result according to a function type (SERP feature) corresponding to a search intention among a plurality of different function types for each response function preset in the search engine, such as keyword advertisement (AD), AD carousel, application, featured snippets, image, job search, knowledge panel, people also search for, Related Searches, etc., in response to the search intention.

For example, as illustrated in FIG. 5, when the search engine receives an input search word, the search engine determines the search intention of the corresponding input search word to generate a plurality of response results corresponding to 'People also search for', as a response function to a collection of other search words searched together with the search word, 'related search words', as a response function to a collection of other search words related to the search word, etc. Such a response result may include an identifier of a function type (response function) corresponding to the response result, a response processing result (or response content) obtained through the response function, and the like.

In other words, when the search engine receives an input search word for 'women's perfume recommendation', the search engine may determine a search intention of the input search word to calculate a response result that includes one or more subsequent search words, such as 'women's perfume ranking 2021', '20s women's perfume ranking 2021', etc. by using a response function of 'People also search for' according to the determined search intention or calculate a response result that includes one or more subsequent search words, such as 'Olive Young Women's Perfume Recommendation', 'Women's Perfume Gift', etc. by using the response function of the 'related search word', and return the corresponding response result as the search result.

In addition, the search information extraction unit 112 may confirm the search result list information and delete or exclude related search words for which nothing is searched so as not to be stored in the keyword DB 101 or 102. That is, the search information extraction unit 112 may exclude or delete a related search word having a search volume of 0 without being stored in the keyword DB 101.

In addition, when one or more response results are included in the search result list information for each of one or more search result list information corresponding to one or more related search words corresponding to the basic search word, the search information extraction unit 112 may identify function types from each of the one or more response results to generate function type information including the identified function types and the number of occurrence frequencies for each of the identified function types, and match the generated function type information with a corresponding related search word to store the generated function type information in the function type DB 103.

In addition, the search information extraction unit 112 extracts one or more texts as subsequent search words from each of the one or more response results corresponding to the function type for each of the one or more response functions used by determining the search intention of the input search word by the search engine based on the search result list information for the input search word returned by the search engine. The search information extraction unit 112 may generate relationship information about a distance to the input search word for each of the extracted one or more subsequent search words by a distance calculation method (according to the distance calculation method) that calculates, as a distance, a weight for a connection relationship between the input search word and a subsequent search word according to an exposure ranking of a specific subsequent search word in the response result corresponding to the specific subsequent search word and a function type of the response result corresponding to the specific subsequent search word.

At this time, the search information extraction unit 112 multiplies a predetermined priority for the function type corresponding to the subsequent search word by an exposure rank (or placement order) of the subsequent search word in the response result corresponding to the subsequent search word to calculate the weight and set the calculated weight as the distance between the subsequent search word and the input search word.

As an example, the search information extraction unit 112 may identify 'plurality of response results (search results) included in the search result list information of 'female perfume recommendation', which is an input search word, and a function type corresponding to 'People also search for' and 'related search word', which are function types corresponding to each of the plurality of response results (search results) included in the search result list information of the input search word 'women's perfume recommendation'.

At this time, in the search information extraction unit 112, setting information for presetting one or more function types to be extracted for a subsequent search word among a plurality of function types provided by the search engine may be set in advance, and a subsequent search word may be extracted only for a function type that is an extraction target of the subsequent search word.

Also, in the setting information, different priorities may be preset for one or more function types that are to be extracted for the subsequent search word.

Accordingly, the search information extraction unit 112 may assign priorities as 1 and 2 for each of 'People also search for' and 'related search word' which are the plurality of function types identified in the search list information corresponding to the input search word 'women's perfume recommendation' according to the setting information, respectively, and assigns an exposure ranking (or exposure ranking weight) according to the ranking of subsequent search words within the function type. The search information extraction unit 112 may extract one or more subsequent search words from each of the plurality of response results, such as ['Women's perfume ranking 2021', Priority 1, Exposure ranking 1, Distance 1], ['20s Women's perfume ranking 2021, Priority 1, Exposure ranking 2, Distance 2], ['Olive Young Women's perfume recommendation', Priority 2, Exposure ranking 2, Distance 4], etc. For each of the extracted one or more subsequent search words, a weight obtained by multiplying a priority and an exposure ranking may be calculated, and then the corresponding weight may be calculated as a distance (distance weight) from the input search word.

In this case, the search information extraction unit 112 may identify (detect) a placement ranking of the subsequent search word for each subsequent search word in the response result, and determine an exposure ranking of the subsequent search word according to the placement ranking.

In addition, the priority may be defined as a priority weight, the exposure ranking may be defined as an exposure ranking weight, and the distance calculated as a value obtained by multiplying the priority weight by the exposure ranking weight may also be defined as a distance weight.

In addition, the search information extraction unit 112 may generate relationship information including a distance calculated for the subsequent search word based on the input search word, the subsequent search word, and the input search word for each of one or more subsequent search words corresponding to the input search word, and store the relationship information in the search word relationship DB 102.

In the aforementioned configuration, the search information extraction unit 112 may apply the subsequent search word as another input search word to the search engine, and as a result, apply a subsequent search word as an input search word to the search engine to extract one or more texts as each additional subsequent search word corresponding to the subsequent search word in each of one or more response results corresponding to each of one or more response function-specific function types that are used by determining the search intention of the input search word by the search engine according to the distance calculation method based on the returned search result list information. Thereafter, the search information extraction unit 112 may calculate, as a distance, a weight for a connection relationship between the input search word and the additional subsequent search word according to an exposure ranking of an additional subsequent search word in a response result corresponding to the additional subsequent search word and a function type of a response result corresponding to the additional subsequent search word. For each of the one or more additional subsequent search words, the search information extraction unit 112 may generate relationship information about a distance from an input search word, which is the subsequent search word, to be stored in the search word relationship DB 102.

That is, the search information extraction unit 112 may apply the subsequent search word to the search engine again as an input search word whenever a subsequent search word corresponding to the input search word is extracted to repeatedly extract other subsequent search words related to the subsequent search word according to the distance calculation method, and generate relationship information about a distance relationship between an input search word related to the other subsequent search word and the other subsequent search word may be generated and stored in the search word relationship DB 102.

Meanwhile, the search path extraction unit 113 sets each of a plurality of search words corresponding to a plurality of relationship information as a node based on the plurality of relationship information stored in the search word relationship DB 102 to generate a direct weight graph setting a distance between the nodes. The search path extraction unit 113 calculates path information for each of one or more paths connecting a start node and an end node determined according to a preset algorithm in the direct weight graph. The search path extraction unit 113 may generate statistical information obtained by averaging preset item-specific statistics for a plurality of search words included in the path information in conjunction with an external server that provides (includes) the search engine and then match the generated statistical information with the path information to be stored in the search path DB 104.

At this time, the search path extraction unit 113 may determine that there is a mutual connection relationship between a plurality of different search words having a distance value based on the relationship information, and generate the direct weight graph by connecting a plurality of different search words having distance values to each other through a connection line, and then setting a distance value on the corresponding connection line.

In addition, the path may be configured to include one or more connection lines for reaching the end node from the start node and nodes corresponding to the one or more connection lines, respectively, and hereinafter, the path is referred to as a search path, and path information corresponding to the path is referred to as search path information.

Figure 6:
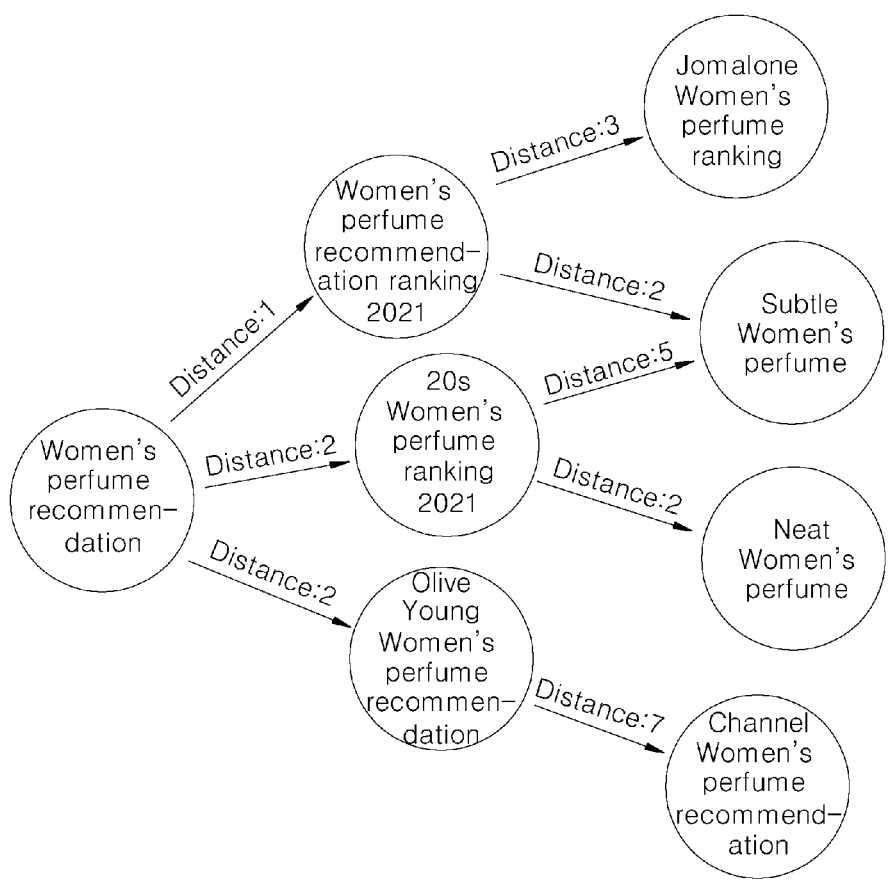
FIG. 6 is an exemplary diagram for generation of a search word relationship graph of the service providing apparatus according to an exemplary embodiment of the present disclosure.

As an example thereof, as illustrated in FIG. 6, the search path extraction unit 113 may extract a connection relationship between a plurality of search words included in the plurality of relationship information and distance information (weight information) based on a plurality of relation information stored in the search word relationship DB 102 and generate a direct weight graph of setting each search word as a node and edging a forward relationship in which a distance (distance value or distance weight) according to the relationship information is assigned to the distance between different nodes (or a search path connecting different nodes).

For example, the direct weight graph includes an input search word and a subsequent search word as nodes, respectively, and includes a relationship between the input search word and the subsequent search word as a forward edge, and may be configured to set a distance weight between the input search word and the subsequent search word as the edge.

At this time, the search path extraction unit 113 may store the direct weight graph in the search path DB 104.

In addition, the search path extraction unit 113 may select an arbitrary search word as a start node according to a predetermined algorithm in the direct weight graph, and then select N nodes having a relatively high importance as end nodes among nodes connected in the forward direction within L hops from the start nod according to the set algorithm.

In this case, the relative importance of different other nodes based on the start node may use a Pagerank algorithm that obtains the importance of a web document.

In addition, the search path extraction unit 113 may generate search path information for each of one or more search paths connecting the start node and the end node for the one or more selected end nodes based on the selected start node according to the direct weight graph.

In addition, the search path extraction unit 113 may confirm one or more end nodes corresponding to the start node according to the algorithm while changing the start node, and calculate K search paths preset in order of shorter search path distance (or entire distance of the search path) among search paths connecting the start node and the end node, and then generate the search path information for each calculated search path.

In addition, the search path extraction unit 113 may generate path list information (search path list information) including at least one search path information having the same start node and end node. That is, the search path extraction 113 may generate path list information by grouping one or more search path information in which a start node is a first search word and an end node is a second search word.

In addition, as illustrated in FIG. 7, the search path extraction unit 113 may communicate with an external server that provides the search engine when generating the path list information to request statistics for each predetermined item by each of the plurality of search words included in the path list information to the external server and generate statistics list information based on statistics for each item collected (received) for each of the plurality of search words from the external server.

At this time, the predetermined item may include a search volume, an advertising unit price, a competition index, and the like, and the search path extraction 113 may store the predetermined item in the search volume DB 105 included in the service providing apparatus 100 whenever receiving search volume information including statistics for each predetermined item from the external server for each of the plurality of search words.

Here, when the search engine is included in the service providing apparatus 100, the control unit 110 of the service providing apparatus 100 may further include a search volume generation unit that generates the search volume information in conjunction with the search engine, and the search volume generation unit may store the search volume information in the search volume DB 105 whenever generating search volume information for each of a plurality of search words in association with the search engine.

In addition, the search path extraction unit 113 may match statistics list information corresponding to the path list information with the path list information and store the information in the search path DB 104.

In addition, the search path extraction unit 113 may confirm the search volume of the search word corresponding to the end node among one or more search path information having the same start node and end node to exclude search path information corresponding to an end node having a search volume of 0 from the path list information.

In addition, the search path extraction unit 113 may confirm statistics for each of predetermined items of each of the one or more search words included in the search path information for each of one or more search path information included in the path list information based on the statistic list information and then generate statistical information including an average value of the statistic for each item by averaging the statistic for each of the confirmed search words for each of the predetermined items.

For example, the statistical information may include an average value of search volumes for a plurality of search words included in specific search path information, an average value of advertising unit prices for a plurality of search words included in specific search path information, an average value of competition indexes for a plurality of search words included in specific search path information, etc.

In addition, when generating the statistical information, the search path extraction unit 113 may match search path information corresponding to the statistical information and store the matched search path information in the search path DB 104.

At this time, the search path extraction unit 113 may set a unique identifier to the search path information when generating the search path information, and match the search path information with the statistical information by setting the corresponding unique identifier even to the statistical information matched with the search path information.

Alternatively, the search path extraction unit 113 may store the statistical information in the search path DB 104 by including the statistical information in search path information corresponding to the statistical information.

When one example therefor is described with reference to FIG. 7, as illustrated, the search path extraction unit 113 may select 'subtle women's perfume' as an end node (end search word) according to the algorithm when selecting 'women's perfume recommendation' as a start node (start search word), generate a plurality of search path information corresponding to a first search path ('women's perfume'→'women's perfume recommendation ranking 2021'→'subtle women's perfume') and a second search path ('women's perfume'→'20s women's perfume ranking 2021'→'subtle women's perfume') connecting the start node and the end node, respectively based on the direction weight graph, and then path list information including the plurality of search path information.

Further, the search path extraction unit 113 may identify a plurality of search words included in path list information based on one or more search path information included in the path list information in link with the external server, and generate statistical amount list information by collecting an item-specific statistical amount for each of the plurality of search words.

In addition, the search path extraction unit 113 may calculate a search quantity average value (347), an advertising unit price average value (0.44), and a competition index average value (0.95) by checking a plurality of predetermined item-specific statistical amounts of each of a plurality of search words including 'women's perfume', women's perfume recommendation ranking 2021', and 'subtle women's perfume' based on first search path information corresponding to a first search path included in the path list information and statistical amount list information corresponding to the path list information, generate first statistical information including the calculated search quantity average value, advertising unit price average value, and competition index average value, and match the first statistical information and the first search path information, and store the matched information in the search path DB 104.

Similarly, the search path extraction unit 113 may calculate second statistical information including a search quantity average value (373), an advertising unit price average value (0.34), and a competition index average value (0.91) based second search path information corresponding to a second search path included in the path list information and the statistical amount list information, and then match the second statistical information with the second search path information corresponding to the second statistical information, and store the matched information in the search path DB 104.

Meanwhile, the optimal path recommendation unit 114 may generate recommendation list information (recommendation path list information) in which one or more search path information including a request search word is sorted based on the ranking condition and statistical information at the time of receiving request information including a request search word and a ranking condition from a user terminal, and provide the generated recommendation list information to the user terminal.

In this case, the service providing apparatus 100 may include a user input unit receiving a user input, and the optimal path recommendation unit 114 included in the control unit 110 may receive the request information based on the user input through the user input unit.

Here, as the ranking condition, various conditions such as a search quantity, an advertising unit price, a competition index, whether there is the function type, etc., may be set.

That is, the optimal path recommendation unit 114 may extract, from the search path DB 104, one or more search path information and one or more statistical information corresponding to the request search word included in the request information at the time of receiving the request information from the user terminal, calculate a score according to a predetermined score calculation criterion for each of one or more items set in the ranking condition included in the request information for the one or more extracted statistical information and sort the one or more extracted statistical information in the order of the score, and then select one or more search path information corresponding to statistical information having a predetermined reference ranking among one or more search path information corresponding to the one or more sorted statistical information, respectively, and provide recommendation list information including the one or more selected search path information to the user terminal.

In this case, the optimal path recommendation unit 114 may compare the score calculated for the statistical information corresponding to the search path information with a score of other statistical information(s) and calculate the ranking of the statistical information, and then sort one or more search path information corresponding to the request information by determining the ranking by a ranking determination scheme of determining the calculated ranking as the ranking of the search path information corresponding to the statistical information, and select one or more search path information having a predetermined reference ranking or more among one or more search path information corresponding to the request information.

In the above-described configuration, the optimal path recommendation unit 114 may extract, from the search path DB 104, only one or more search path information having the request search word as the end node, and generate the recommendation list information for the one or more extracted search path information.

That is, the optimal path recommendation unit 114 selects a search path constituted only by one or more search words required for reaching the request search word as the recommendation search path to generate the recommendation list information.

Further, the optimal path recommendation unit 114 may include at least one of statistical information corresponding to the search path information, search quantity information including an item-specific statistical amount for each of the plurality of search words included in the search path information, and function type information for a function type of a response result corresponding to each of the plurality of search words included in the recommendation search path information in the recommendation list information to correspond to each of one or more search path information included in the recommendation list information, and then provide the recommendation list information to the user terminal in the form of the UI or API.

In this case, the optimal path recommendation unit 114 may generate analysis result information including at least one of the statistical information corresponding to the search path information, the search quantity information including the item-specific statistical amount for each of the plurality of search words included in the search path information, and the function type information for the function type of the response result corresponding to each of the plurality of search words included in the recommendation search path information in the recommendation list information to correspond to each of one or more search path information included in the recommendation list information with respect to each of one or more search path information included in the recommendation list information while including the recommendation list information in the form of the UI or API, and then provide the recommendation list information to the user terminal.

To this end, the optimal path recommendation unit 114 may provide the recommendation list information including one or more statistical information corresponding to one or more search path information included in the recommendation list information, respectively to the user terminal, and thus allow specific statistical information corresponding to specific search path information selected by the user among one or more search path information included in the recommendation list information to be displayed in the user terminal jointly with the specific search path information.

Further, the optimal path recommendation unit 114 may request a predetermined item-specific statistical amount for each of the plurality of search words included in the recommendation list information to the external server, and generate the statistical amount list information based on the item-specific statistical amount collected (received) for each of the plurality of search words corresponding to the recommendation list information from the external server, and then provide the recommendation list information including the statistical amount list information to the user terminal. In this case, the predetermined item may include the search quantity, the advertising unit price, the competition index, etc.

In this case, the optimal path recommendation unit 114 may extract a plurality of search word-specific search quantity information included in the recommendation list information from the search quantity DB 105, and generate the statistical amount list information based on the plurality of extracted search word-specific search quantity information, and then provide the recommendation list information including the statistical amount list information to the user terminal.

Through this, the user terminal may display and provide the item-specific statistical amount (or search quantity information) related to a specific search word when the specific search word included in the specific search path information is selected by the user while displaying specific search path information selected by the user among one or more search path information included in the recommendation list information upon receiving the recommendation list information.

As one example described above, as illustrated in FIG. 8, the optimal path recommendation unit 114 may acquire one or more search path information corresponding to the request search word 'anbang grill' in the search path DB 104 as the recommendation search path information, and then acquire each of one or more statistical information corresponding to the one or more recommendation search path information, respectively from the search path DB 104 as interested statistical information when 'anbang grill' which is the request search word according to the request information and 'advertising unit price (CPC) order' which is the ranking condition according to the request information are received upon receiving the request information.

Further, the optimal path recommendation unit 114 may generate and return recommendation list information in which the one or more recommendation search path information is sorted in the order of the advertising unit price which is the ranking condition based on the one or more interested statistical information in the form of an application programming interface (API).

As an example, when CPC values of respective search words 'grill', 'grill', 'grill recommendation', 'anbang grill', 'anbang grill 501', 'anbang grill ab301mf', and 'fish grill' are 2.503594, 0.119853, 0.127498, 0.248646, 0, 0.118544, and 0.28 in 'grill'→'grill'→'grill recommendation' 'anbang grill'→'anbang grill 501'→'anbang grill ab301mf'→'fish grill' which is a first recommendation search path having a highest ranking in the recommendation list information, 0.4854 which is an average of the CPC values of the search words included in the first recommendation search path as a score of the first recommendation search path, and respective other recommendation search paths included in the recommendation list information are also calculated by the same scheme as a score calculation scheme of the first recommendation search path to sort one or more recommendation search paths included in the recommendation list information in the order of the score.

In this case, the optimal path recommendation unit 114 may confirm the average value of the CPC values of the search words included in the first recommendation search path in the statistical information (interested statistical information) corresponding to the first recommendation search path information, and calculate the average value as the score.

Further, in the above-described configuration, the optimal path recommendation unit 114 may acquire each of one or more search path information corresponding to the request search word from the search path DB 104 as recommendation candidate path information, calculate the score for each of the one or more recommendation candidate path information as described above, and select each of one or more recommendation candidate path information in which the score is calculated as a predetermined reference value or more as the recommendation search path information, and provide the recommendation list information to the user terminal as a final result (final result information) corresponding to the request information by including only the selected recommendation search path information in the recommendation list information.

As a result, the optimal path recommendation unit 114 may provide the final result including only a search path having high relevancy with the request search word and the ranking condition, and exclude a search path having low relevancy with the request search word and the ranking condition from the final result.

Figure 9:
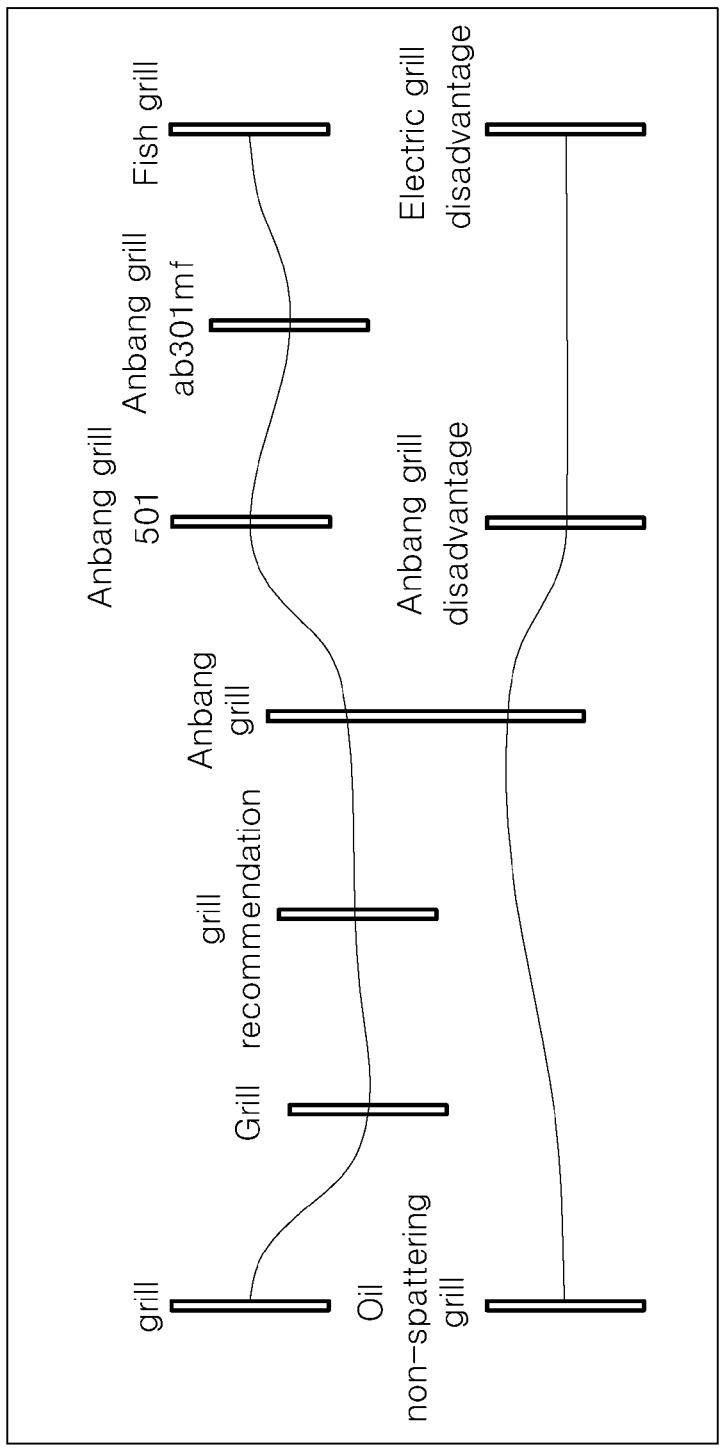
FIG. 9 is an exemplary diagram for providing of a recommended search path word network UI of the service providing apparatus according to an exemplary embodiment of the present disclosure.

Further, as illustrated in FIG. 9, the optimal path recommendation unit 114 may schematize and output a word network UI based on the recommendation list information acquired to correspond to the request search word when the request search word 'anbang grill' and the ranking condition 'advertising unit price (CPC) order' are received.

As an example, the optimal path recommendation unit 114 may express each search word by a box and sort a previous search word for 'anbang grill' which is a specific node corresponding to the request search word on the path at a left side of the specific node, and sort a subsequent search word of the specific node at a right side of the specific node, and generate and provide recommendation list information configured by a flow diagram type user interface (UI) which interconnects different nodes (search words) by an edge according to the first and second recommendation search path information when the first recommendation search path information included in the recommendation list information included in the recommendation list information acquired to correspond to the request information is 'grill'→'grill'→'grill recommendation'→'anbang grill'→'anbang grill 501'→'anbang grill ab301mf' 'fish grill' and the second recommendation search path information included in the recommendation list information is 'oil non-spattering grill'→'anbang grill'→'anbang grill disadvantage'→'electric grill disadvantage'.

Further, the optimal path recommendation unit 114 may express a height of a box by a size (or the number) of an incoming edge or an outgoing edge of each search word, or express a color of the box with information (the search quantity, the advertising unit price, the competition index, etc.) of the search word on the path.

Figure 10:
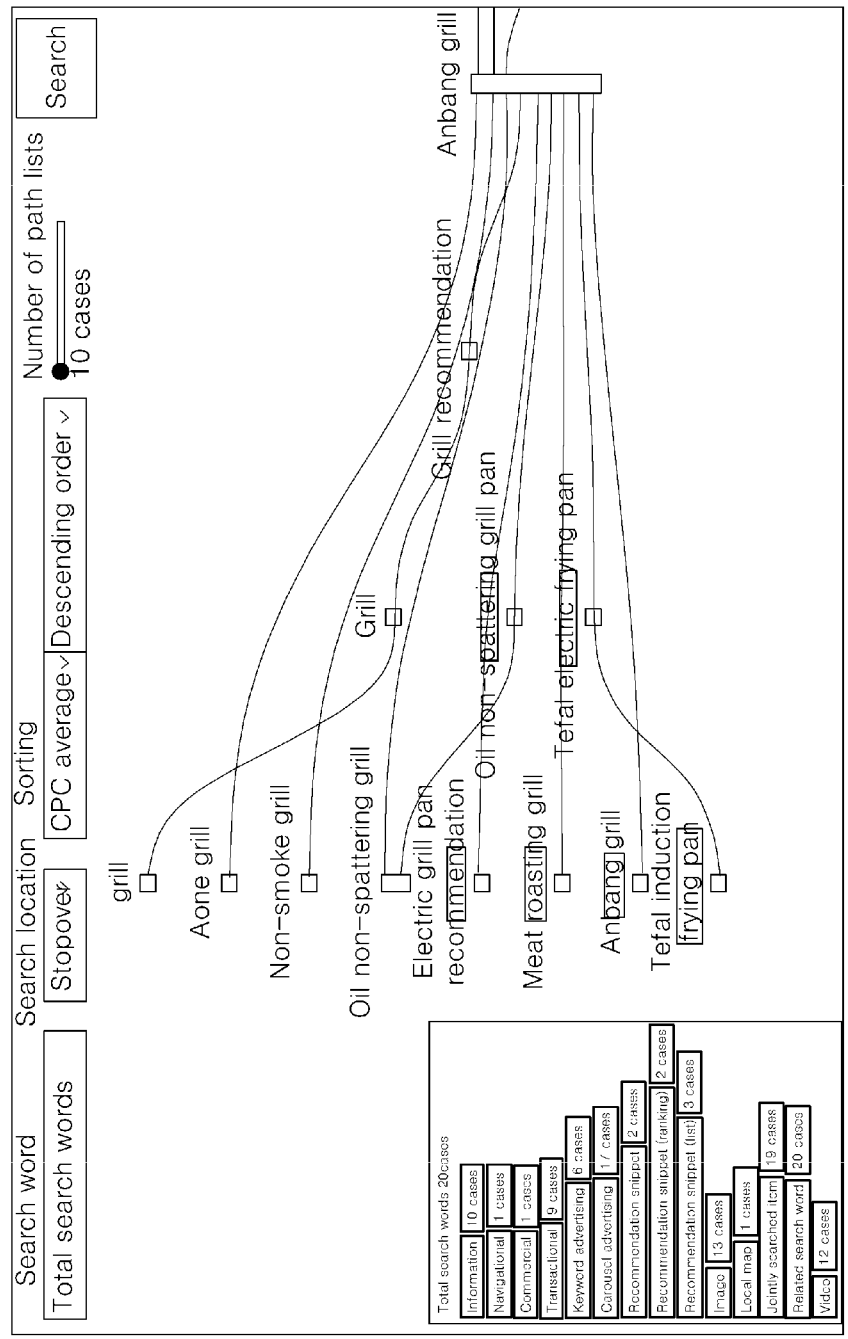
FIG. 10 is an exemplary diagram for a node highlight function in the recommended search path word network UI of the service providing apparatus according to an exemplary embodiment of the present disclosure.

Further, as illustrated in FIG. 10, the optimal path recommendation unit 114 may extract the function type information corresponding to the search word for each of the plurality of search words included in the recommendation list information from the function type DB 103 and match the function type information with the search word, and add the matched information and search word to the recommendation list information and provide the recommendation list information to the user terminal, and thus allow one or more boxes corresponding to one or more search words corresponding to a specific function type selected by the user, respectively to be emphasized and displayed or one or more boxes corresponding to the remaining search words other than one or more search words corresponding to the specific function type, respectively to be filtered and displayed when displaying the UI according to the recommendation list information in the user terminal.

As described above, according to the present disclosure, a related search word related to a basic search word by applying each basic search word obtained while adding different letters for a keyword to a search engine to extend the search word, a relevancy between one or more subsequent search words and an input search word obtained based on a search result of searching the extended search word through a search engine by applying the extended search word to the search engine with the input search word is obtained by a distance according to a search intention of the input search word and an exposure ranking of the subsequent search word determined in the search word, search words with a distance from each other are interconnected based on a distance between the search words to generate a search path, and then a recommended search path list is provided, which is related to a request search requested by a user and an advertising attribute on which the user puts emphasis to support a related search word having the highest relevancy with the request search word of the user and having high advertising efficiency among search words positioned on a path for reaching the request search word of the user through the recommended search path list to be easily selected and used for marketing.

Further, according to the present disclosure, an optimal search path corresponding to the request search word requested by the user is provided in the form of UI or API to support the user to easily obtain a search word list suitable for advertising/marketing, search information (a search quantity, an advertising unit price, advertising competition, etc.) for the search word, and function type information.

Moreover, according to the present disclosure, a connection relationship between the search words is just expressed by exceeding a level of providing the related search word through a word network UI generated based on the search path to be provided to determine a primary search journey of users for products or services, and needs of the user for what the user requests, what the user compares, etc., are supported to be more intuitively determined.

Figure 11:
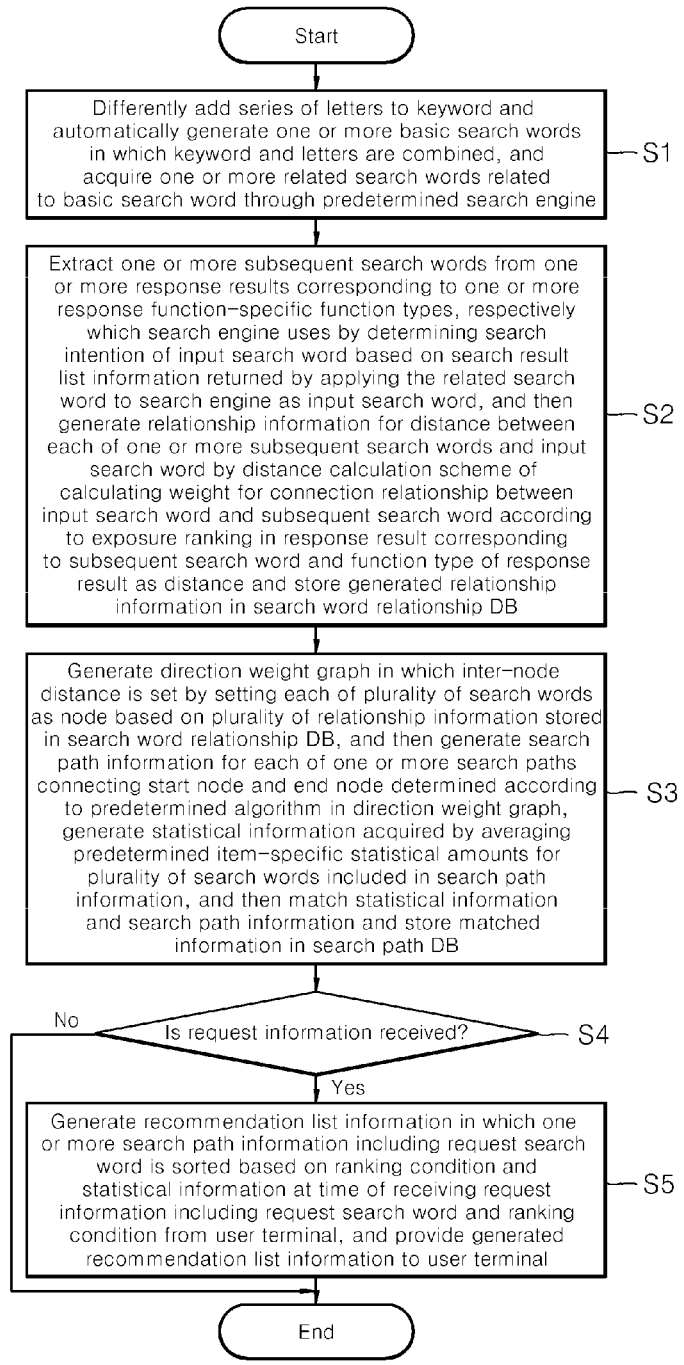
FIG. 11 is a flowchart for a service providing method for providing a search path according to an exemplary embodiment of the present disclosure.

FIG. 11 is a flowchart for a service providing method for providing a search path of a service providing apparatus 100 according to an exemplary embodiment of the present disclosure.

The service providing apparatus 100 may differently add a series of letters to a keyword and automatically generate one or more basic search words in which the keyword and the letters are combined, and acquire one or more related search words related to the basic search word through a predetermined search engine (S1).

Further, the service providing apparatus 100 may extract one or more subsequent search words from one or more response results corresponding to one or more response function-specific function types, respectively which the search engine uses by determining a search intention of the input search word based on search result list information returned by applying the related search word to the search engine as an input search word, and then generate relationship information for a distance between each of one or more subsequent search words and the input search word by a distance calculation scheme of calculating a weight for a connection relationship between the input search word and the subsequent search word according to an exposure ranking in the response result corresponding to the subsequent search word and a function type of the response result as the distance and store the generated relationship information in the search word relationship DB 102 (S2).

Further, the service providing apparatus 100 may generate a direction weight graph in which an inter-node distance is set by setting each of the plurality of search words as the node based on the plurality of relationship information stored in the search word relationship DB 102, and then generate the search path information for each of one or more search paths connecting a start node and an end node determined according to a predetermined algorithm in the direction weight graph, generate statistical information acquired by averaging predetermined item-specific statistical amounts for the plurality of search words included in the search path information, and then match the statistical information and the search path information and store the matched information in the search path DB 104 (S3).

Further, the service providing apparatus 100 may generate recommendation list information in which one or more search path information including a request search word is sorted based on the ranking condition and statistical information at the time of receiving request information including the request search word and the ranking condition from the user terminal (S4), and provide the generated recommendation list information to the user terminal (S5).

The components described in the exemplary embodiments of the present disclosure may be implemented by using one or more universal computers or special-purpose computers like hardware such as a processor controller, an arithmetic logic unit (ALU), a digital signal processor, a microcomputer, a digital signal processor, a field programmable array (FPA), a programmable logic unit (PUL), a microprocessor, or any other device capable of executing and responding to software including an instruction set or a combination thereof or an instruction.

The aforementioned contents can be corrected and modified by those skilled in the art without departing from the essential characteristics of the present disclosure. Therefore, the exemplary embodiments of the present disclosure are provided for illustrative purposes only but not intended to limit the technical concept of the present disclosure. The scope of the technical concept of the present disclosure is not limited thereto. The protection scope of the present disclosure should be construed based on the following appended claims and it should be appreciated that the technical spirit included within the scope equivalent to the claims belongs to the scope of the present disclosure.

DESCRIPTION OF SYMBOLS

100: service providing apparatus
101: keyword DB
102: search word relationship DB
103: function type DB
104: search path DB
105: search quantity DB
110: control unit
111: search word expansion unit
112: search information extraction unit
113: search path extraction unit
114: optimal path recommendation unit
120: Communication unit
130: Storage unit

What is claimed is:

1. A service providing apparatus for providing a search path, comprising:
  a search word expansion unit configured to differently add a series of letters to a keyword and automatically generate one or more basic search words in which the keyword and the letters are combined, and acquire one or more related search words related to a basic search word through a predetermined search engine;
  a search information extraction unit configured to extract one or more subsequent search words from one or more response results corresponding to one or more response function-specific function types, respectively which the predetermined search engine uses by determining a search intention of an input search word based on search result list information returned by applying a related search word to the predetermined search engine as an input search word, and then generate relationship information for a distance between each of one or more subsequent search words and the input search word by a distance calculation scheme of calculating a weight for a connection relationship between the input search word and the subsequent search word according to an exposure ranking in a response result corresponding to the subsequent search word and a function type of the response result as the distance and store the generated relationship information in a search word relationship database (DB);

a search path extraction unit configured to generate a direction weight graph in which an inter-node distance is set by setting each of a plurality of search words as a node based on a plurality of relationship information stored in the search word relationship DB, and then generate a search path information for each of one or more search paths connecting a start node and an end node determined according to a predetermined algorithm in the direction weight graph, generate statistical information acquired by averaging predetermined item-specific statistical amounts for the plurality of search words included in the search path information, and then match the statistical information and the search path information and store the matched information in a search path database (DB); and an optimal path recommendation unit configured to generate recommendation list information in which one or more search path information including a request search word is sorted based on a ranking condition and statistical information at the time of receiving request information including a request search word and a ranking condition from a user terminal, and provide the generated recommendation list information to the user terminal, wherein the search information extraction unit calculates the weight by multiplying a priority predetermined for a function type corresponding to the subsequent search word and an exposure ranking for the subsequent search word in a response result corresponding to the subsequent search word, and sets the calculated weight as the distance between the subsequent search word and the input search word, wherein the search path extraction unit confirms one or more end nodes corresponding to the start node according to the predetermined algorithm while changing the start node, and calculates K search paths preset in order of shorter search path distance among search paths connecting the start node and the end node, and then generates the search path information for each calculated search path, and wherein the search path extraction unit determines a predetermined number of end nodes in order of relatively higher importance with the start node based on a pagerank algorithm.

2. The service providing apparatus for providing a search path of claim 1, wherein the related search word is an auto complete search word generated by the predetermined search engine based on the basic search word.

3. The service providing apparatus for providing a search path of claim 1, wherein the search information extraction unit applies the subsequent search word as another input search word to the predetermined search engine, and as a result, applies a subsequent search word as an input search word to the predetermined search engine to extract one or more texts as each additional subsequent search word corresponding to the subsequent search word in each of one or more response results corresponding to each of one or more response function-specific function types that are used by determining the search intention of the input search word by the predetermined search engine according to a distance calculation method based on the returned search result list information, calculates, as a distance, a weight for a connection relationship between the input search word and the additional subsequent search word according to an exposure ranking of an additional subsequent search word in a response result corresponding to the additional subsequent search word and a function type of a response result corresponding to the additional subsequent search word, and generates relationship information about a distance from an input search word, which is the subsequent search word, to be stored in the search word relationship DB for each of a one or more additional subsequent search words.

4. The service providing apparatus for providing a search path of claim 1, wherein the search path extraction unit calculates statistical information including an average value of an item-specific statistical amount of at least one of a search quantity, an advertising unit price, and a competition index for a plurality of search words included in the search path information, and then matches the calculated statistical information with the search path information corresponding to the statistical information and stores the matched information in the search path DB.

5. The service providing apparatus for providing a search path of claim 1, wherein the optimal path recommendation unit extracts, from the search path DB, one or more search path information and one or more statistical information corresponding to the request search word included in the request information at the time of receiving the request information from the user terminal, calculates a score according to a predetermined score calculation criterion for each of one or more items according to the ranking condition included in the request information for the one or more extracted statistical information and sorts the one or more extracted statistical information in the order of the score, and then selects one or more search path information corresponding to statistical information having a predetermined reference ranking among one or more search path information corresponding to the one or more sorted statistical information, respectively, and provides recommendation list information including the one or more selected search path information to the user terminal.

6. The service providing apparatus for providing a search path of claim 1, wherein the optimal path recommendation unit includes at least one of statistical information corresponding to the search path information, search quantity information including an item-specific statistical amount for each of the plurality of search words included in the search path information, and function type information for a function type of a response result corresponding to each of the plurality of search words included in a recommendation search path information in the recommendation list information to correspond to each of one or more search path information included in the recommendation list information, and then provides the recommendation list information to the user terminal in the form of a user interface or application programming interface.

7. A service providing method for providing a search path of a service providing apparatus, comprising:

differently adding a series of letters to a keyword and automatically generating one or more basic search words in which the keyword and the letters are combined, and acquiring one or more related search words related to a basic search word through a predetermined search engine;

extracting one or more subsequent search words from one or more response results corresponding to one or more response function-specific function types, respectively which the predetermined search engine uses by determining a search intention of an input search word based on search result list information returned by applying a related search word to the predetermined search engine as an input search word, and then generating relationship information for a distance between each of one or more subsequent search words and the input search word by a distance calculation scheme of calculating a weight for a connection relationship between the input search word and the subsequent search word according to an exposure ranking in a response result corresponding to the subsequent search word and a function type of the response result as the distance and storing the generated relationship information in a search word relationship database (DB);

generating a direction weight graph in which an inter-node distance is set by setting each of a plurality of search words as a node based on a plurality of relationship information stored in the search word relationship DB, and then generating a search path information for each of one or more search paths connecting a start node and an end node determined according to a predetermined algorithm in the direction weight graph, generating statistical information acquired by averaging predetermined item-specific statistical amounts for the plurality of search words included in the search path information, and then matching the statistical information and a search path information and storing the matched information in a search path database (DB); and generating recommendation list information in which one or more search path information including a request search word is sorted based on a ranking condition and statistical information at the time of receiving request information including a request search word and a ranking condition from a user terminal, and providing the generated recommendation list information to the user terminal, calculating the weight by multiplying a priority predetermined for a function type corresponding to the subsequent search word and an exposure ranking for the subsequent search word in a response result corresponding to the subsequent search word, and setting the calculated weight as the distance between the subsequent search word and the input search word, confirming one or more end nodes corresponding to the start node according to the predetermined algorithm while changing the start node, and calculating K search paths preset in order of shorter search path distance among search paths connecting the start node and the end node, and then generating the search path information for each calculated search path, and determining a predetermined number of end nodes in order of relatively higher importance with the start node based on a pagerank algorithm.

* * * * *